United States Patent
Seppanen et al.

(10) Patent No.: US 8,244,569 B2
(45) Date of Patent: Aug. 14, 2012

(54) NON-DESTRUCTIVE ELEMENT SPLITTING USING LOCATION-BASED CONSTRUCTION PLANNING MODELS

(75) Inventors: Olli P. P. Seppanen, Espoo (FI); Clay J. Freeman, Dallas, TX (US); Marcel Broekmaat, Fort Lauderdale, FL (US)

(73) Assignee: Vico Software Kft., Budapest (HU)

( * ) Notice: Subject to any disclaimer, the term of this patent is extended or adjusted under 35 U.S.C. 154(b) by 1125 days.

(21) Appl. No.: 12/062,349

(22) Filed: Apr. 3, 2008

(65) Prior Publication Data
US 2010/0043342 A1 Feb. 25, 2010

(51) Int. Cl.
*G06Q 10/00* (2012.01)
(52) U.S. Cl. ............. 705/7.23; 705/301; 705/28; 703/1; 52/236.1
(58) Field of Classification Search ........................ None
See application file for complete search history.

(56) References Cited

U.S. PATENT DOCUMENTS

| | | | |
|---|---|---|---|
| 5,109,337 | A | 4/1992 | Ferriter et al. |
| 5,761,674 | A * | 6/1998 | Ito .......................................... 1/1 |
| 6,037,945 | A | 3/2000 | Loveland |
| 6,859,768 | B1 | 2/2005 | Wakelam et al. |
| 6,868,525 | B1 | 3/2005 | Szabo |
| 7,042,468 | B2 | 5/2006 | Schwegler et al. |
| 7,233,885 | B1 | 6/2007 | Larabee et al. |
| 2001/0047251 | A1 | 11/2001 | Kemp |
| 2002/0013704 | A1 | 1/2002 | Finney |
| 2002/0035451 | A1 | 3/2002 | Rothermel |
| 2002/0194113 | A1 | 12/2002 | Lof et al. |
| 2003/0050871 | A1 * | 3/2003 | Broughton ...................... 705/28 |
| 2003/0135401 | A1 | 7/2003 | Parr |
| 2003/0167265 | A1 | 9/2003 | Corynen |
| 2003/0225605 | A1 | 12/2003 | Yokota et al. |
| 2004/0205519 | A1 | 10/2004 | Chapel et al. |
| 2005/0038636 | A1 | 2/2005 | Wakelam et al. |
| 2005/0108982 | A1 | 5/2005 | Formisano |

(Continued)

FOREIGN PATENT DOCUMENTS

EP 1 393 255 3/2004

OTHER PUBLICATIONS

Ma et al.., "Application of 4D for dynamic site layout and mangement of construciton projects," automation construction 14 (2005) pp. 369-381.*

(Continued)

*Primary Examiner* — Jonathan G Sterrett
*Assistant Examiner* — Tzu-Hsiang Lan
(74) *Attorney, Agent, or Firm* — Jackson Walker L.L.P.; Christopher J. Rourk

(57) ABSTRACT

A system for location-based management of construction is provided. A plurality of location systems generate one or more locations where construction activities associated with one or more elements in each location can be performed. A construction activity location system associates each of a plurality of construction tasks with one of the locations. An element splitting system receives an element selection and associates one or more construction tasks of the element with two or more locations. A construction activity association system associates one or more of the plurality of construction tasks with one or more of the other construction tasks. A construction sequence system generates a sequence of construction tasks based on the layer associated with each construction task and based on the other construction tasks associated with each construction task.

20 Claims, 10 Drawing Sheets

U.S. PATENT DOCUMENTS

| | | | |
|---|---|---|---|
| 2005/0197856 A1 | 9/2005 | Drucker | |
| 2006/0044307 A1 | 3/2006 | Song | |
| 2006/0074608 A1* | 4/2006 | Clay et al. | 703/1 |
| 2006/0185275 A1* | 8/2006 | Yatt | 52/236.1 |
| 2008/0301153 A1* | 12/2008 | Greer et al. | 707/10 |
| 2009/0210277 A1* | 8/2009 | Hardin et al. | 705/8 |

OTHER PUBLICATIONS

EP Search Report dated Feb. 17, 2006 (6 pgs.).

Non-Final Office Action for U.S. Appl. No. 10/956,902 dated Jan. 10, 2007 (12 pgs.).

Wang et al., "4D Dynamic Resource Management for Construction Planning and Resource Utilization," Automation in Construction, vol. 13, Issue 5, pp. 575-589, Sep. 2004, available online—Jun. 1, 2004.

Kam et al., "The Product Model and Fourth Dimension Project," ITcon, vol. 8, pp. 137-166, 2003.

Kazi et al., "Management of Best Practices in Construction Through Interfacing with Product Models," obtained from http://cic.vtt.fi/projects/globemen/book/index.html, created Nov. 26, 2002, Presented as "Product Models as an Interface to Best Practice Management in the Construction Industry," eSM@RT, Nov. 19-21.

Kazi et al., "Distributed Engineering in Construction: Findings from the IMS Globemen Project," ITcon, vol. 6, 2001, pp. 129-148.

Froese et al., "Industry Foundation Classes for Project Management—A Trial Implementation," 1999, ITcon, vol. 4, pp. 17-36, http://www.itcon.org/1999/2.

Non-Final Office Action for U.S. Appl. No. 10/956,902 dated Aug. 29, 2007 (23 pgs.).

Non-Final Office Action for U.S. Appl. No. 10/956,902 dated Apr. 10, 2008 (25 pgs.).

PCT Search Report and Written Opinion for PCT/US06/37773 dated Feb. 12, 2008 (7 pgs.).

Non-Final Office Action for U.S. Appl. No. 11/375,871 dated May 13, 2008 (11 pgs.).

Final Office Action for U.S. Appl. No. 11/375,871 dated Nov. 26, 2008 (15 pgs.).

PCT Search Report and Written Opinion for PCT/US07/06353 dated Sep. 8, 2008 (10 pgs.).

Zhang et al., "4D Visualization of Construction Site Management," Information Visualization, 2001, Proceedings, Fifth International Conference on Information Visualization, pp. 382-387, posted online: Aug. 7, 2002.

Nyambayo et al., "External Product Library System—An Implementation Industry Foundation Classes Release 2.0 Library Model," 2003, retrieved from http://www.cs.auckland.ac.nz/~trebor/papers/NHYAM00A.pdf (10 pgs).

Office Action for U.S. Appl. No. 11/235,344 dated Aug. 24, 2007 (23 pgs.).

Final Office Action for U.S. Appl. No. 11/235,344 dated Jul. 8, 2008 (27 pgs.).

PCT Search Report and Written Opinion for PCT/US07/17828 mailed Nov. 18, 2008 (9 pgs.).

Lutz et al., "Analyzing Linear Construction Operations Using Simulation and Line of Balance," 1993, Transportation Research Board (Abstract), pp. 1-3.

Yang et al., "Stochastic Resource—Constrained Scheduling for Repetitive Construction Projects with Uncertain Supply of Resources and Funding," available online Apr. 18, 2005, International Journal of Project Management, vol. 23, pp. 546-553.

Kankainen et al., "A Line-of-Balance Based Schedule Planning and Control System," 2003, 11$^{th}$ International Group for Lean Construction Conference, Virginia Tech, Virginia (12 pgs.).

Trofin, "Impact of Uncertainty on Construction Project Performance Using Linear Scheduling," 2004, University of Florida, pp. iii-xiii and pp. 1-91.

Yang et al., Stochastic Analysis on Project Duration Under the Requirement of Continuous Resource Utilization, Aug. 2002, Proceedings IGLC-10, Brazil, pp. 1-13.

Non-Final Office Action for U.S. Appl. No. 11/502,690 dated Jul. 23, 2009 (14 pgs.).

McCabe, "Monte Carlo Simulation for Schedule Risks," 2003, Proceedings of the 2003 Winter Simulation Conference, pp. 1561-1565.

Altug, "Risk Management and Post Project Evaluation Processes for Research and Development Projects," 2002, Sabanci University, pp. 1-101.

Ma et al., "Application of 4D for Dynamic Site Layout and Management of Construction Projects," Automation Construction 14 (2005) pp. 369-381.

\* cited by examiner

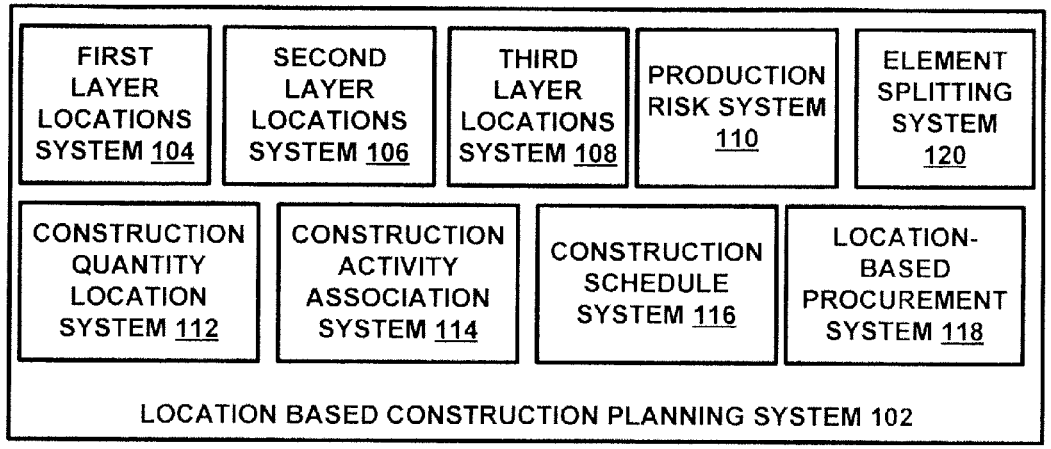
FIGURE 1A     100
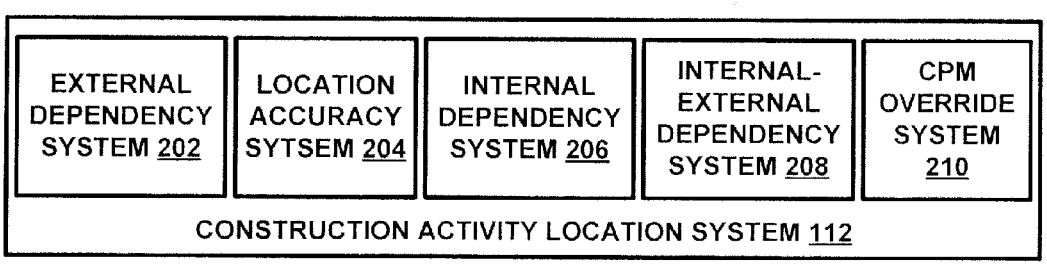
FIGURE 2     200
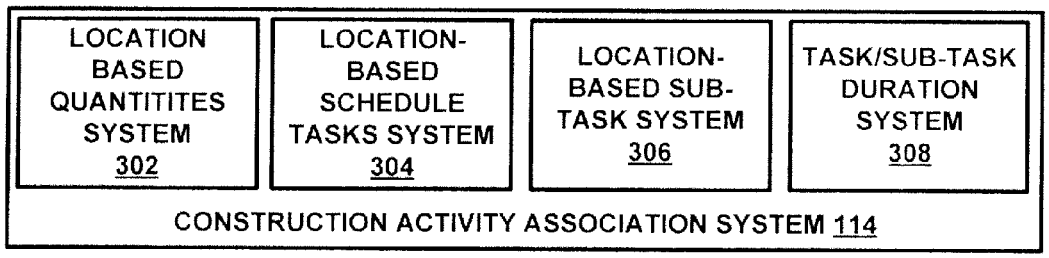
FIGURE 3     300

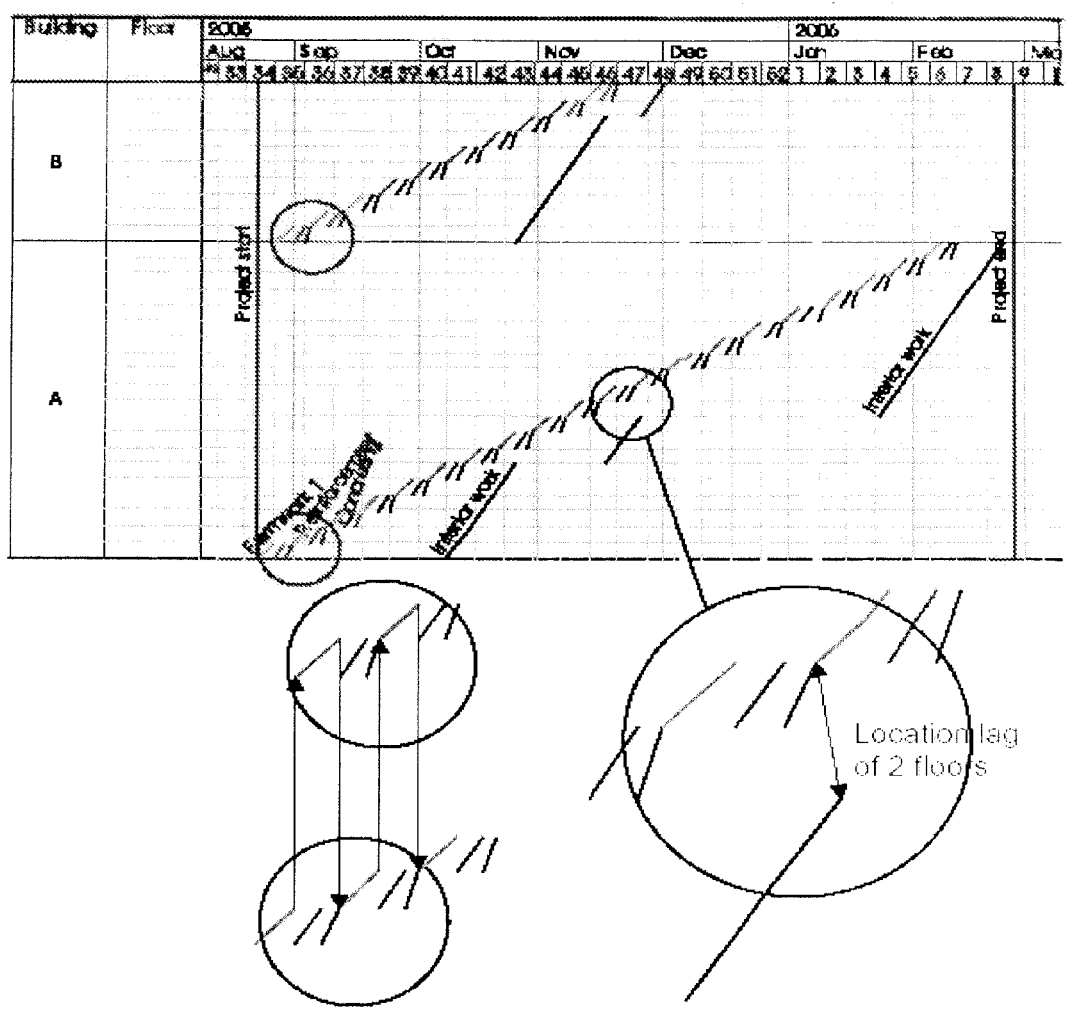

US 8,244,569 B2

NON-DESTRUCTIVE ELEMENT SPLITTING USING LOCATION-BASED CONSTRUCTION PLANNING MODELS

FIELD OF THE INVENTION

The present invention pertains to the field of automated, CAD model based construction planning and scheduling, and more particularly to a system and method for non-destructive element splitting in conjunction with location-based methodologies.

BACKGROUND OF THE INVENTION

Construction planning has typically been performed manually. To the extent that any construction planning processes can be automated, they have been limited to critical path method processes where the materials, resources, and other constraints for individual tasks are modeled. However, assignment of these tasks to locations within a construction project and coordination of the tasks has been performed manually. As a result, whenever changes are made to the design, an extensive amount of manual work must be done, which prevents changes from being readily modeled and tested.

SUMMARY OF THE INVENTION

In accordance with the present invention, a system and method for location-based planning are provided that overcome known problems with automating CAD model based construction activity planning.

In particular, a system and method for location-based planning are provided that allow CAD model elements that span multiple locations to be non-destructively split, so as to allow the location parameters to be changed without the need to regenerate the originally-split element.

A system for location-based management of construction is provided. A plurality of location systems generate one or more locations where construction activities associated with one or more elements in each location can be performed. A construction activity location system associates each of a plurality of construction tasks with one of the locations. An element splitting system receives a CAD element selection and associates one or more construction tasks of the element with two or more locations. A construction activity association system associates one or more of the plurality of construction tasks with one or more of the other construction tasks. A construction sequence system generates a sequence of construction tasks based on the layer associated with each construction task and based on the other construction tasks associated with each construction task.

The present invention provides many important technical advantages. One important technical advantage of the present invention is location-based construction modeling that allows an element that spans two or more locations to be non-destructively split, so as to retain the original element in the event that location parameters are changed it is necessary to subsequently split the element.

Those skilled in the art will further appreciate the advantages and superior features of the invention together with other important aspects thereof on reading the detailed description that follows in conjunction with the drawings.

BRIEF DESCRIPTION OF THE DRAWINGS

FIGS. 1A-1F are diagrams of a system for location-based construction planning in accordance with an exemplary embodiment of the present invention;

FIGS. 2A-2F are diagrams of a system for construction activity location coordination in accordance with an exemplary embodiment of the present invention;

FIG. 3 is a diagram of a construction activity association system in accordance with an exemplary embodiment in the present invention;

DETAILED DESCRIPTION OF PREFERRED EMBODIMENTS

Figure 1B:

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1A is a diagram of a system 100 for location-based construction planning in accordance with an exemplary embodiment of the present invention. System 100 allows construction planning to be performed based on considerations of locations of construction tasks or activities, and can be used in conjunction with critical path method (CPM) construction planning processes or other suitable construction planning processes.

System 100 includes location-based construction planning system 102 and first layer locations system 104, second layer locations system 106, third layer locations system 108, production risk system 110, construction quantity location system 112, construction activity association system 114, construction schedule system 116, and location-based procurement system 118, each of which can be implemented in hardware, software, or a suitable combination of hardware and software, and which could be one or more software systems operating on a general purpose processing platform.

As used herein, a hardware system can include discrete semiconductor devices, an application-specific integrated circuit, a field programmable gate array, a general purpose processing platform, or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Location-based construction planning system 102 uses the concept of location-based tasks to automate creation of CPM external logic to define the logic or connections between different activities within locations. Location-based tasks are collections of CPM-based activities that can be performed continuously by shifting start dates of location activities so that finish date of preceding location activity inside the task is always equal to start date of the succeeding location activity associated with the task. In this manner, these location-based tasks allow schedule creation to be automated and continuity to be optimized. Changing a property of a task can be used to affect all activities associated with the task. Unlike construction planning techniques that only use CPM location-based planning also considers a location-based task's internal logic by allowing a planner to plan the location sequence and production rate to achieve continuous production. Thus, CPM logic can be applied within locations, and location-based flow logic can be applied between locations. A location-based task can contain one or more CPM activities, each of which can correspond with a physical location, an element of the construction model, or other suitable items.

Activities correspond with single locations of a location-based task. Location-based tasks are collections of CPM activities and they can be continuously performed. Activities of location-based tasks are generated by associating construction quantities with the task. Construction quantities can be derived from CAD elements which belong to the location or they can be manually entered. A location activity is generated for each location where the quantities are positive. A location-based task can be continuously performed if the finish date of preceding CPM location activity is equal to the start date of succeeding CPM location activity, for all pairs of locations in the sequence of implementation.

In one exemplary embodiment, a task can be associated with a CAD element and can contain work which can be done by a single crew, or split among multiple crews. Location-based construction planning system 102 identifies locations in a project using a location breakdown structure which has many properties in common with the more familiar work breakdown structure. Locations should be hierarchical so that a higher level location logically includes all lower level locations. In special projects, this correlation might not be straightforward. However, some general guidelines can be used that apply to commercial construction and that do not apply to special cases, such as linear infrastructure projects. These include that the highest level location hierarchies should consist of locations where it is possible to build the structure independently of other sections, for example, individual buildings or parts of large buildings. Likewise, the middle level should be defined so that a flow can be planned across middle level locations. For example, elements such as riser floors in a residential construction project where a floor is usually finished before moving to the next floor can be assigned to the middle level. Finally, the lowest level location should generally be small, such that only one trade can effectively work in the area, for example, apartments, individual retail spaces, and corridors. The lowest level location should be able to be accurately monitored, for example, the foreman must be able to assess whether or not the work is completed in that location.

Using this hierarchy, exemplary first layer locations system 104, second layer locations system 106, and third layer locations system 108 are provided with location-based construction planning system 102. Additional layer locations systems can also be provided where suitable. First layer locations system 104 generates one or more first locations where construction activities can be performed in parallel. Likewise, second layer locations system 106 generates one or more second layer locations where construction activities can be performed in parallel for one or more of the first locations. Second layer locations system 106 corresponds to a middle level as defined above. Likewise, third layer locations system 108 generates third layer locations where construction activities can be performed in parallel for one or more of the second layer locations. Third layer locations system 108 corresponds to the lowest level locations, as described above.

First layer locations systems 104, second layer locations system 106, third layer locations system 108, and any other suitable locations systems define the hierarchical relationship between the locations and interact with the remaining systems of a location-based construction planning system 102 so as to allow CPM external logic to define the logic or connection between different tasks within locations, and also to consider a task's own internal logic by allowing the planner to plan the location sequence and production rate to achieve continuous production.

Production risk system 110 models construction project risk by the use of distributions and simulation. Scheduled tasks can have the following exemplary distributions:
 crew specific start distribution
 resource specific production rate distribution
 prerequisite distributions (e.g. design, procurement)
 weather risks (for weather prone tasks)
 crews specific comeback delay if there are discontinuities
 location risk (modeling risks related to particular locations)

Production risk system 110 can perform simulation procedures including sampling the distribution, such as simulating weather, simulating targeted start date for one or more crew, simulating one or more production prerequisites, simulating the production rate for one or more resource, and simulating location risks for one or more location. Next, the schedule can be built based on these simulated values. The locations can be sorted so that all predecessor locations are calculated before successor locations. The sort can be adjusted so that all locations of a task are processed before locations of any other task. The start date of the location can have a maximum such as a first crew start date, prerequisites, and dependencies. A duration of the location can also be provided, such as the quantity of man hours in the location divided by the sum of production rate factors of resources calculated daily depending on whether crews are available plus allocation risk factor. Finally, the finish date of the location can be determined using the maximum of the start date plus the duration plus weather delays and dependencies.

If a simulated start date of an X location is greater than the finished date of the last location, then accommodations must be made for resources to either wait for the finished or leave the site and return. If resources leave the site, comeback delay distribution is sampled for each crew and the resulting value is added to the start date. Finally, the results are recorded. The production system cost for labor and waste can be calculated, in addition to the overhead cost and interference (defined as all points where simulated start date of the next location of the same task are greater than the finished date of the last location of the same task). The results can be simulated then over multiple simulation rounds using the variables that are identified for weather, targeted start date for crews, simulated production prerequisites for starting a location, simulated production rates for resources, simulated location risks for locations, and other suitable variables.

Production risk system 110 also provides monitoring functionality for dynamic re-assessment of production risk. In one exemplary embodiment, monitoring interval data is modeled for each task, including deviation tolerance data that defines when a deviation from a planned task requires modification of a schedule. In this exemplary embodiment, the tolerance data can include production rate deviation data, total delay deviation data, or other suitable data. When the tolerance data for a task is greater than the monitoring interval, detection occurs at the next monitoring interval. In addition, an implemented control action can be assigned to each task. In one exemplary embodiment, the implemented control action can be reduced to two alternatives such as adding resources or working overtime, in order to reduce computational complexity. Likewise, where a task is ahead of schedule, resources can be rescheduled to a slower task to avoid schedule delay.

In this manner, the production risk for a project can be determined using objective data. Thus, the potential for a project to be finished early, late, for costs to be increased, or for other complications can be objectively modeled and analyzed prior to initiation of the projects.

Construction quantity location system 112 provides location-based quantities for construction activities as well as

|      |      | Project: Project Section: | | | | | | | | | | |
|------|------|---|---|---|---|---|---|---|---|---|---|---|
|      |      | Building A | | | | | Building B | | | | | |
|      |      | Floor: | | | | | | | | | | |
| Code | Item | 1 | 2 | 3 | 4 | Roof | 1 | 2 | 3 | 4 | Roof | Unit |

The LBS should be decided in advance, before the quantity surveyor measures or quantities are derived from CAD elements, and the planner should participate in this stage.

|      |      |      | Project: Project Section: | | | | | | | | | | |
|------|------|------|---|---|---|---|---|---|---|---|---|---|---|
|      |      |      | Building A | | | | | | Building B | | | | |
|      |      |      | Floor: | | | | | | | | | | |
|      |      |      | 1 | 2 | 3 | 4 | Roof | 1 | 2 | 3 | 4 | Roof | Unit |
| Code | Item |      | Consumption man hours/unit | | | | | | | | | | |
| 456100 | Erect plasterboard walls between apartments | 0.65 | 1 | | | | | | | | | | M2 |
| 456226 | Mount 13 mm special gyproc paneling on plasterboard wall | 0.16 | 8.6 | 26 | 26 | 26 | | 31 | 35.4 | 35.4 | 35.4 | | M2 |
| 456216 | Mount 13 mm gyproc paneling on plasterboard wall | 0.16 | 8.6 | 26 | 26 | 26 | | 25.5 | 30 | 30 | 30 | | M2 |
| 456146 | Mount 79 mm paneling on dwelling room wall adjacent to sauna | 0.46 | 8.6 | 26 | 26 | 26 | | 25.5 | 30 | 30 | 30 | | M2 |
| 456136 | Mount 92 mm paneling on washroom wall | 0.46 | 10.7 | 22.5 | 22.5 | 22.5 | | 14.1 | 19.6 | 19.6 | 19.6 | | M2 |
| 456126 | Mount 79 mm paneling on washroom wall adjacent to sauna | 0.46 | 6.4 | 9.5 | 9.5 | 9.5 | | 3.1 | 6.2 | 6.2 | 6.2 | | M2 |
| 456116 | Mount 92 mm paneling on dwelling room wall | 0.46 | 57.4 | 118.6 | 118.6 | 118.6 | | 109.8 | 134.3 | 134.3 | 134.3 | | M2 | location-based relationships for construction activities. Quantities are an important aspect of the logic of location-based scheduling and in particular the internal logic of a task. The bill of quantities (Measures) of a task defines explicitly all work that must be completed before a location is finished and the crew may continue to the next location. For example, a tiling task can include waterproofing and floor plastering work to be done with the same crew. Thus, a task's bill of quantities (BOQ) may include many items, even with different units, gathered into a single task where quantities of each of the items may vary from location to location.

After the location breakdown structure (LBS) is constructed, the quantities may be estimated by location manually or derived from CAD elements associated with locations. Actual planning begins with the project's BOQ and the first task of the planner is to lump related BOQ items into logical packages where the work can be done by same crew, has the same dependency logic outside of the package, and can be completely finished in one location before moving to the next location. It is also necessary to ensure quantities are available for all remaining tasks. This can be done by making sure that 3D model includes all elements to be constructed and that all CAD elements are linked to tasks. This approach ensures that nothing of relevance is left out of the schedule and enables very powerful ways of both project control and handling change orders and claims.

The creation of BOQ can be demonstrated in the following example. First, the LBS of the project is defined. In this example project, there are two buildings with four floors and a roof on each building.

For an individual task, the BOQ may look like the preceding table. The plasterboard wall task includes different kinds of walls that can be done with the same plasterboard crew. There are quantities in all locations except the roof. The quantities are generally larger in building two than in building one and the smallest quantities are in the first floor.

Construction quantity location system 112 uses the quantities to generate CPM location activities of a location-based task. A location activity is generated for each location where the quantities are positive. In the above example, location-based task "Plasterboard walls" would have locations Building A: floors 1, 2, 3 and 4 and Building B floors 1, 2, 3, 4. It may not have a location activity on the roof because all quantities on the roof are zero. The consumption column and the calculations are described below.

Construction quantity location system 112 calculates the duration of each location activity by considering quantity of the location, labor consumption associated with the quantity and resources of the location-based task. Total man-hours needed to complete a location is equal to resource consumption times quantity summed over all quantity items in the location. Duration (in hours) in a location is the total man-hours in the location divided by amount of workers. This duration can be changed to be days by dividing by workday length.

The quantities result in the flow line in FIG. 1B, where it is visible that there is no work being done on the roofs of either building because quantities in these locations are zero. It also takes a noticeably shorter time to finish the first floor and the slope becomes gentler in the second building because of the larger quantities.

A location-based BOQ strengthens the planning process when using location-based planning. If the quantities change or there is a variation (such as a change order or due to risk assessment), the schedule can be updated by changing the quantity or linked CAD elements. Durations and location activities can then be updated automatically.

Because resources and productivities are properties of location-based tasks, changing productivity or resources of a location-based task automatically updates all the location activities.

The external logic of location-based tasks controls the links between activities or tasks within locations. In location-based logic, it is assumed that in each location the logic between separate tasks is similar. This simplifies the complexity as it is only necessary to create a link between two location-based tasks, which is then copied to each individual CPM location activity in a location. Thus, it is possible to consider a generic logic network defining a relationship between activities in any location. A logical connection created between two tasks is therefore automatically created and replicated for each location, regardless of relationships existing between locations. This is the primary logic layer and is equivalent to traditional CPM logic. CPM calculations can be used but the logic network is automatically generated based on the location-based tasks.

Figure 1C:

The exemplary FIG. 1C represents two tasks which occur on every floor of two buildings. There is a layer 1 finish start link between the activities, such that task 1 must be finished on any floor before task 2 can commence on the same floor.

Construction activity association system 114 provides for internal dependency logic between locations within tasks. These dependencies are used to achieve the flow of resources in uninterrupted work, to model risk, and for other suitable purposes. This is the internal logic within the task but between location activities. Unless deliberate decisions are made to the contrary, using multiple work crews, it may be assumed that work flows between locations sequentially with finish-to-start links. Thus, even though external CPM logic may allow work to commence early, the work cannot proceed until the resources are released according to the internal task logic.

Internal logic of a location-based task means that each task can have an internal location sequence that describes the sequence in which the locations will be completed for that task. The sequence for each task is independent of other tasks or any sequence for the project. This planning decision can be made when scheduling projects.

Figure 1D:
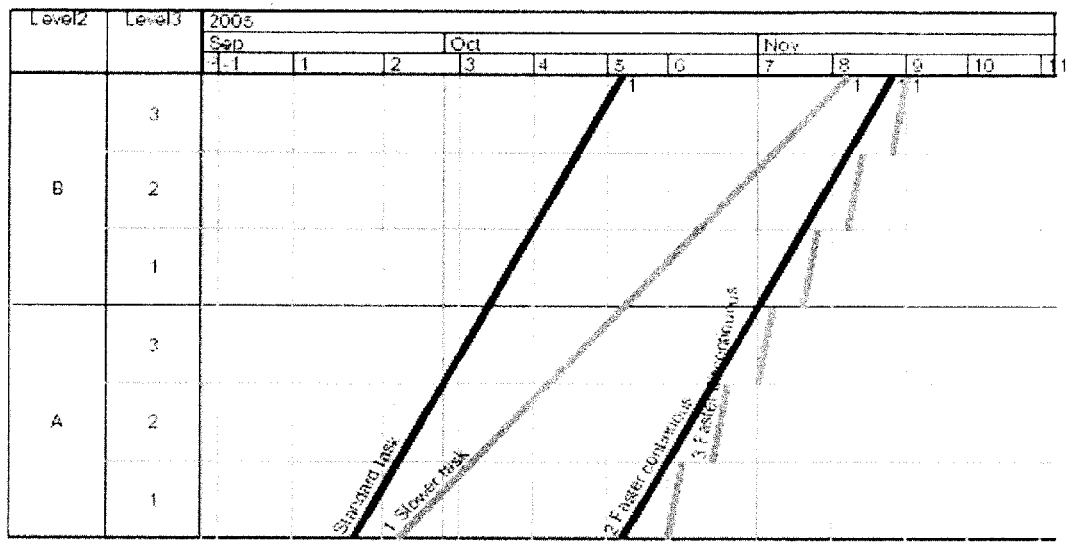

Internal logic enables sequential work, however, external logic can cause interruption in the flow of work if the succeeding task is quicker than the preceding task. There are three special cases: slower continuous work, faster discontinuous work, and faster continuous work.

Where the succeeding task is slower than predecessor, the task starts as early as possible and gradually gets further behind the preceding task (task 1—slower task in FIG. 1D). Likewise, where the succeeding task is faster than its predecessor but is to remain continuous the task start date is delayed until the work may complete as early as possible and will remain continuous (task 2—faster continuous in the above figure). Finally where the succeeding task is faster than its predecessor and is allowed to be discontinuous, the tasks start as early as possible in each location (task 3—faster discontinuous in the above figure). This is the way most site managers react with faster tasks, but may be less efficient.

The third layer of internal logic provides standard CPM links to other locations for the same task while the first layer provides the links to other tasks within the same location. The CPM calculations can be used directly in the forward pass if everything starts as soon as possible, which is a requirement of CPM. However, third layer internal logic allows for faster work to be forced to be continuous, as the alternative will, in most cases, cost more money and cause disturbance on a site due to discontinuous work. Continuity of location-based tasks means that all its location activities are performed in sequence without breaks in between (i.e. finish date of preceding location=start date of succeeding location). In order to accomplish this for selected tasks the start date of latter locations will be used to pull the start dates of earlier locations so that continuity can be achieved.

Figure 1E:
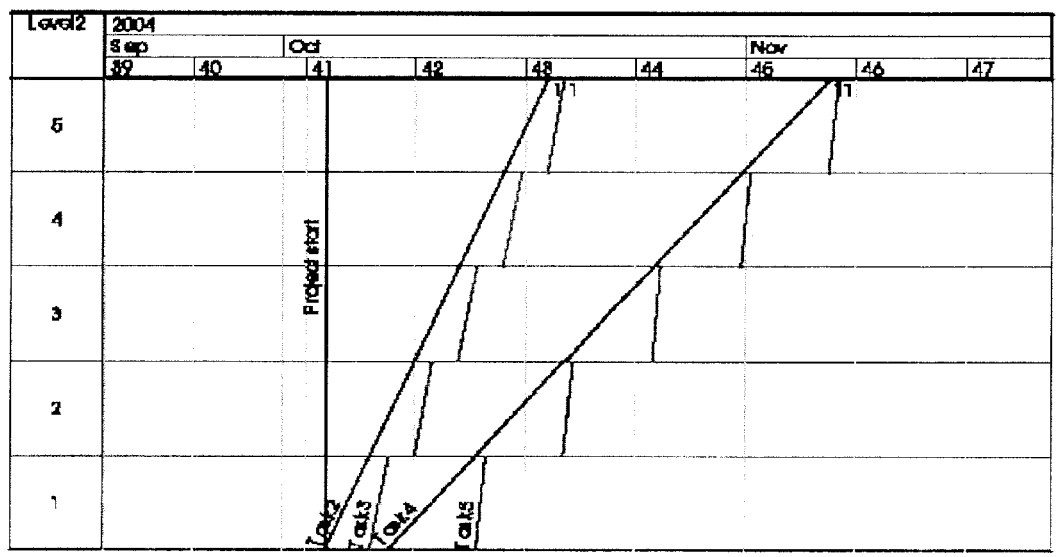

For example, a project with five floors and four tasks with finish to start links between tasks in each location is shown in FIG. 1E. Task 3 is faster than task 2 in each location so there is a break of flow of one day on each floor. Task 5 is faster than task 4 and its flow is broken for four days on each floor. This means the workers of tasks 3 and 5 will have to slow down or they will run out of work (and probably leave the site). Note the in time of CPM solution (Friday week 45).

Flow-oriented planning allows tasks to be continuous, even where it delays the start dates of overly fast tasks. Third layer location-based scheduling logic allows the user to choose the task which would be done continuously and the tasks where the flow can be broken.

Figure 1F:
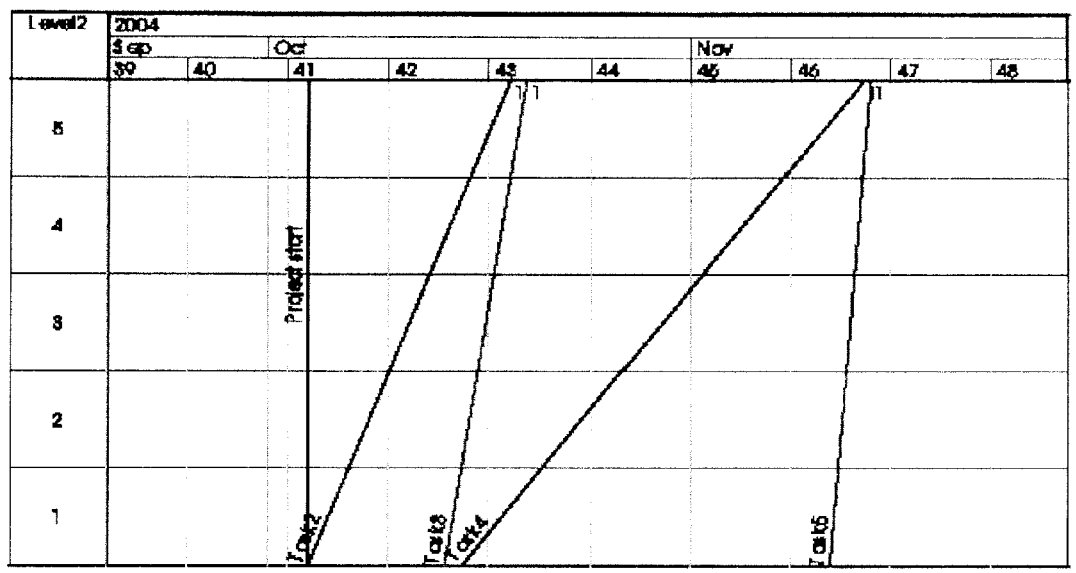

FIG. 1F shows the same example where all the tasks have been forced to be continuous so that start dates of faster activities have been pulled to a later time. The end time has jumped one week to the Friday of week 46. However this schedule has less risk and saves costs due to the continuity of production. There is still room for improvement because it would be possible to save time by adding resources to bottleneck tasks or removing them from overly fast tasks.

Construction schedule system 116 interfaces with first layer locations system 104, second layer locations system 106, third layer locations system 108, production risk system 110, construction quantity location system 112, and construction activity association system 114, as well as potentially with location-based procurement system 118 to generate the construction schedule. In one exemplary embodiment, construction schedule system 116 can generate construction schedules based on variable parameters that are modified so as to determine the effect of having crews wait on site, having crews leave, to accommodate for risks caused by weather or delay, or to otherwise generate comparative construction schedules to determine optimal construction scheduling. In this manner, construction schedules that accommodate location-based variables can be readily generated for comparison and determination of optimal construction scheduling.

Location-based procurement system 118 includes procurement tasks that are composed of quantity items (resources and/or methods). The same quantities are used as for schedule tasks and can provide a connection between schedule tasks, procurement tasks and CAD elements. A procurement task can be work or material that is procured from the same supplier as one delivery contract or subcontract.

Procurement task properties can include quantities, suppliers, floor person, and procurement events, such as things that have to be done first before delivery, or an event that has a name and delay before the succeeding event. The last event is usually delivery for a procurement task.

Procurement task calculations can be performed for work and material need times for each quantity item. Each quantity item can belong to one schedule task and one procurement task. The need time can be taken from the scheduled start date of the scheduled task of that quantity for each location. Scheduled tasks linked to the procurement task can have as one of their properties a hierarchy level of delivery, such as by creating a delivery that contains all of the quantities needed by a single or multiple locations of a schedule task. The hierarchy level of deliveries can be greater than the hierarchy level of quantities. For example, deliveries may be planned using first level locations even if quantities have been estimated for second level locations. The suggested delivery date can be the minimum need time of included quantities, including delivery delay. If multiple deliveries would happen on the same day, they can also be lumped together as the same delivery. Procurement event need times can be calculated for each event. If the need time precedes the event, the procurement time will be an event lag. If the event doesn't have a preceding event, first suggested delivery is used as a preceding event. The target cost is the total cost of quantities included.

Element splitting system 120 allows one or more CAD elements that overlap two or more different locations to be split non-destructively in a predetermined manner so as to allow tasks associated with the element to be allocated to one or more of the locations that the element overlaps. In one exemplary embodiment, a plurality of sub-tasks can be created and associated with each location, such as where the element is amenable to being split up. In another exemplary embodiment, the element can be allocated to the location in which the majority of the element is located. In another exemplary embodiment, where the element is unable to be split due to element-specific constraints, it can be allocated to the location having the highest position in a work breakdown structure, such as a location that must be completed before a second location that include the non-destructively split element can be started.

System 100 can provide for location-based construction planning that allows location of tasks to be included in construction scheduling. Location-based construction planning system 102 allows tasks to be coordinated based on task dependencies, allows risks affecting task parameters such as productivity, start date, or completion date to be modeled, and task location of dependencies and other variables to be modeled that can affect the ability to accurately schedule a construction project.

Figure 2B:
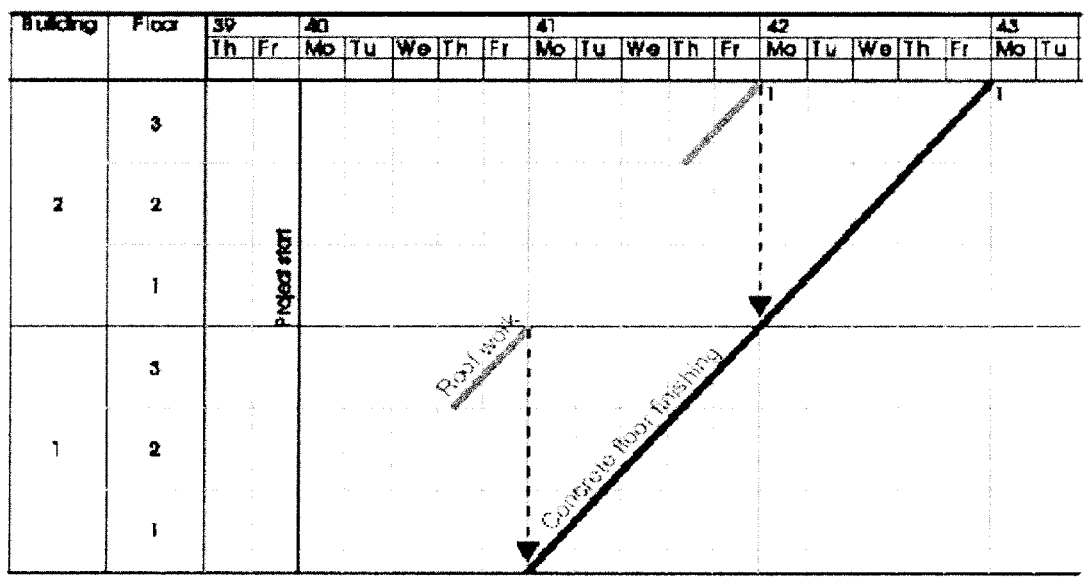

FIG. 2A is a diagram of a system 200 for construction activity location coordination in accordance with an exemplary embodiment of the present invention. System 200 includes construction quantity location system 112 and external dependency system 202, location accuracy system 204, and internal dependency system 206, internal-external dependency system 208 and CPM override system 210, each of which can be implemented in hardware, software, or a suitable combination of hardware and software, and which can be one or more software systems operating on a general purpose processing platform.

External dependency system 202 identifies the external logic of location-based tasks and controls the links between location activities or tasks within locations, including risk-modified links. In location-based logic it is assumed that in each location the logic between separate tasks is similar. This greatly simplifies the complexity, as it is only necessary to create a link between two location-based tasks, which is then copied to each individual CPM activity in a location. Thus it is possible to consider a generic logic network defining the relationships between activities in any location. The logical connection created between two tasks is therefore automatically created and replicated for each location, regardless of relationships existing between locations. This is the primary logic layer and is equivalent to traditional CPM logic and the calculations are the same as in CPM but they are automatically replicated for each location.

In one exemplary embodiment, external links to other scheduled tasks can be standard critical path method links such as finish-start links, start-start links, start-finish links, and finish-finish links, that are copied to each location. In one exemplary embodiment, the location-based links can start after the preceding task has proceeded two floors above the succeeding task. In this manner, external dependencies such as may be imposed on a location-based task can be accounted for. In another exemplary embodiment, probabilistic models for risks due to weather, availability of materials or resources, quality or other factors can be modeled, such as were such risks affect parameters such as productivity, start date, completion date or other suitable parameters.

Location accuracy system 204 provides external higher level logical relationships between activities driven by different levels of accuracy. In order to layer CPM logic or task relationships at different levels of accuracy, each location-based task must be allocated an accuracy level that corresponds to a hierarchy level in the location breakdown structure. The accuracy level means the lowest level of a location that is relevant to the task. For example, the natural accuracy level for structure would be floor or pour, depending on the project, because the structure is raised sequentially by floor. The natural accuracy level for finishes can be the individual apartment or even a room.

Just as tasks have a location-based accuracy level, similarly, each link between tasks has an accuracy level. This link can be defined at a suitable level of accuracy which is the same or rougher (higher) as the highest accuracy level of the two location-based tasks. For example, in FIG. 2B, if roof work and concrete floor finishing work both have the floor level accuracy, setting the accuracy level of the link between the tasks to building would mean that the roof must be finished in a building before the concrete floor finishing work can start in the same building.

Internal dependency system 206 defines the internal dependency logic between locations within tasks. This logic layer allows the achievement of flow of resources and uninterrupted work. This is the internal logic within a task between locations.

Unless decisions to the contrary are made, using multiple work crews, it may be assumed that work flows between locations sequentially with finish to start links. Thus, even though the external CPM logic may allow work to commence early, the work cannot proceed until the resources are released according to the internal task logic. It is not that internal logic takes precedence, but rather that both must apply.

In addition, the task has an internal location sequence that describes the sequence in which the locations will be completed for that task. The sequence for each task is independent of other tasks or any perceived sequence for the project, and this is one of the important planning decisions to be made when scheduling projects.

Figure 2C:

In one exemplary embodiment, a task is created that is done only on fourth floor and the roof of buildings A and B. In FIG. 2C, the predecessor to the plasterboard task appears to flow through the plasterboard task where there is no plasterboard (on the roof). The plasterboard wall must be done after the task predecessor on each level where (and only where) both tasks exist. This can be used to optimize the sequence of work.

It should also be noted that lags and buffers are not an additional layer of logic, as they belong to all dependency relationships, as they can be an important part of the layered logic of the location-based system. Lags are a well-known component of CPM logic and need little explanation. Buffers, on the other hand, are a novel concept. A lag is the required fixed duration of a logical connection between two activities or tasks. In contrast, a buffer is the absorbable allowance for disturbance between adjacent tasks or locations and is a component of the logical connection between two tasks.

Buffers appear to be very similar to the lags except that they are there to protect the schedule and/or intended to absorb minor variations in production. The continuous flow of work needs to be protected. Therefore each dependency link has an additional attribute, a buffer. A buffer functions technically exactly the same way that a lag of the dependency does, however it is used only when calculating the forward and backward passes of the plan schedule to establish the earliest start dates. It is also used to calculate the flow of locations and location-based tasks. The technical lags are used instead when forecasting future problems during the implementation phase or when doing risk analysis and analysis of the probability of interference. The buffer may be absorbed by delay without impacting on the overall project duration.

System 200 thus allows construction activity location scheduling to be performed by providing for external dependencies, location accuracy, internal dependencies, internal to external dependencies, and CPM overrides. In this exemplary embodiment, system 200 allows more effective construction project planning by providing for a location-based planning to be used in conjunction with CPM and other conventional construction planning processes and external logic. In this manner, location lags in the sequencing of external logic can be accommodated. Just as there can be a time lag between activities and CPM, there can be a location lag between tasks in location-based planning.

Internal-external dependency system 208 accommodates location lags in the sequencing of external logic. For example, pouring horizontal concrete in a structure interferes with the formwork of the floor above and with the interior work often two floors below its location due to back propping. It does not affect the same floor, or a higher LBS level (the whole building) so this cannot be modeled using accuracy levels. However this can be modeled using just two location lag links. Formwork is preceded by pouring horizontal concrete with a lag of minus one floor. Interior works are preceded by pouring horizontal concrete with a lag of plus two floors. A negative location lag of one means that a lower location must be finished before starting the succeeding task on the next floor. A positive lag of two floors means that two higher locations must be finished before starting the succeeding tasks on a floor. Location-based lags can work only within a sub-hierarchy of the LBS (e.g. one building) or in all its sub-hierarchies, to avoid examples such as the floors of one building restricting the finishes in the next building.

Figure 2E:
Figure 2D:

FIG. 2D is an example of two buildings of twenty and ten floors. There are four tasks on each floor: formwork, reinforcement, concrete and interior work. The links are normal location-based except that formwork is preceded by concrete with the lag of minus one floor and interior work by concrete with the lag of two floors. The sequence of locations (internal logic) has been manipulated so that waiting times are minimized. The formwork crew can work in the second building when it would have had to wait in the first building. Interior work 1 has been split into two parts to optimize continuity and duration. Optimizing the internal location sequence of interior work tasks results in six floors being done first in building A and then switching to building B for eight floors, and then the crew goes to building A to finish three more floors and finally finish building B. The crew has a break of eight weeks before coming back to finish building A. The formwork crew can therefore work continuously by working in two buildings. However reinforcement and concreting tasks have waiting time because of their faster production rate.

CPM override system 210 allows standard CPM logic links to be used between any task and any location. If applied internally to the task, the logic supersedes the internal logic of the task, for example, constraining possible sequences. If created between two tasks and two locations, this link type can be used to account for special circumstances such as one part of the LBS affecting other parts of the LBS. This layer is needed to model, for example, links between structures and finishes in complex location breakdown structures with the same LBS used for both structures and finishes (for example in a sports stadium with different LBS branches for each of the structure and functional spaces).

Figure 2F:
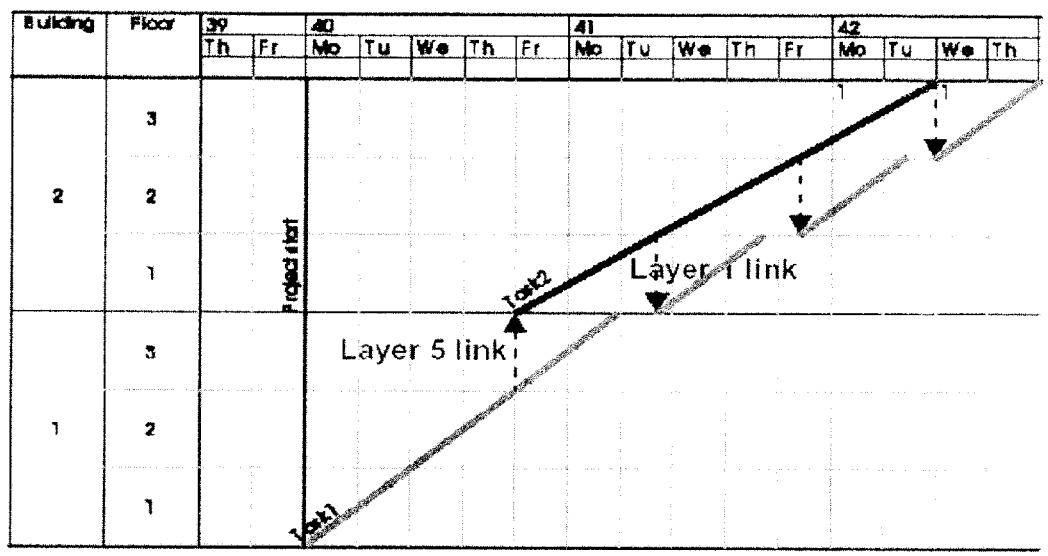

In FIG. 2E, task 2's first location 2-1 must follow task 1's location 1-2 (a single location layer five link). There is also a constant layer one link between the tasks such that task 1 must succeed task 2 on every floor. This example illustrates that multiple layers of logic must be able to be active simultaneously. In the special case illustrated above, the relationship between the two tasks in fact becomes circular. This works for this example, however, were task 1 to be slower than task 2, task 2 could not be made continuous, in which case location-based logic takes precedence and thus task 2 will become discontinuous, as shown in FIG. 2F. Any attempt to make task 2 continuous would relocate the layer five link in time with a cascading affect.

In addition to the standard CPM operation of checking for circular logic between location activities, circular logic needs to be checked for location-based tasks. Location-based tasks can have circular logic that does not result in circular logic between location activities. This can easily happen with a combination of layer five logic and other logical layer links. Therefore, ordinary CPM calculations would not be effective, but updating start dates to achieve continuity would cause the problem of updating the other task again, thus breaking continuity. In this case, start dates can be shifted by the continuity heuristic only to the point where the shift does not affect the previous task.

FIG. 3 is a diagram of a construction activity association system 114 in accordance with an exemplary embodiment in the present invention. Construction activity association system 114 includes location-based quantity system 302, location-based schedule tasks system 304, location-based subtask system 306, and task/sub-task duration system 308, each of which can be implemented in hardware, software, or a suitable combination of hardware and software, in which can be run on more software systems operating a general purpose processing platform.

System 300 can be implemented using the following set of assumptions for the data processed by system 300:

All the work included in a task will be undertaken by a common resource (which is a property of a location-based task).

The common resources apply the same production or productivity factors for all the items in the task (which is a simplification from real life, where a worker's productivity factor can vary from 1.0 when the worker is performing a task to 0.0 when the worker is cleaning, hauling refuse, or performing other non-value adding activities).

The resource production factors are independent of the item or item quantity.

There is an optimal crew composition for the task.

The resources do all the locations included in the task in sequence (overlapping requires task splitting).

The resources completely finish a location before moving to the next location.

These assumptions require a different methodology of planning and controlling work in new kinds of contracts to support project control. These issues are applicable to the various systems in system 300.

Location-based quantity system 302 provides location-based quantities estimated or derived from CAD elements for the location of any location and any location breakdown structure. These include providing starting data for items by item name, consumption rate in hours per unit, accuracy level, quantity for each location on the accuracy level (note this quantity can be zero which means that the work does not exist in that location) and unit. In this manner, location-based quantity system 302 provides location-based quantities estimated for each of the locations in a location breakdown structure.

Location-based schedule tasks system 304 provides location-based scheduled tasks by name, included quantity items, accuracy level (defined by the roughest accuracy level of the included quantity item), locations (defined by the locations of the included quantity items), and one or more subtasks that contain the location. For example, location-based schedule tasks system 304 can require a planner to identify the location-based schedule tasks and to assign the associated properties for such tasks.

Location-based subtask system 306 identifies subtasks with properties that include locations, a sequence of locations (logic layer three sequence), an optimal crew, the number of optimal crews, production factors of resources in the optimal crew, location difficulty factors, timing option (as soon as possible, as soon as possible and continuous, continuous and manual), targeted start date for use when the task is not as soon as possible, shift length in time units and holiday or days off, logic links to predecessors with the following properties: the predecessor task, the link type (finish-start, start-finish, start-start, finish-finish), the lag (in shifts or time units), the buffer (in shifts), the location accuracy of the link: a layer one link if fine (low) as the rougher of the two tasks accuracies: a layer two link if rougher (higher); or if layer five link, specify that the link is between individual locations; for layer four link, the location lag if not equal to zero, and for layer four links does the link apply only in the same branch of the location breakdown structure.

Task/sub-task duration system 308 determines the duration for a task or sub-task for use in location-based scheduling. The duration of shifts in each location may be calculated based on quantities and crews selected using the following exemplary steps. First, the quantity of man-hours needed to complete the task or sub-task at the location is calculated. Next, the result is divided by the sum of the production factors of the selected resources to obtain the duration for the task in hours. The duration of the task is divided by the shift length to get the duration in shifts for the task, which can then be adjusted based on a difficulty factor. It should be noted that the duration of a CPM activity may be manipulated by changing properties of a location-based task, such as quantities, productivities, or durations.

The CPM model may therefore be calculated from the location-based heuristics by performing the following steps:
  Calculate the durations of each location of each task based on quantities, resources and productivities
  Create the activity network from location-based links
    Layer 1 links: create a link of the same type between the locations shared by both tasks.
    Layer 2 links: the link will affect either the first or last location within the sequence of locations at the tasks own accuracy level because the task will always have a more accurate location breakdown than the accuracy level of the link,
      F-S: create a F-S link between the last location of the predecessor within the link's level of accuracy and the first location of the successor within the link's level of accuracy.
      S-S: create a S-S link between the first location of the predecessor within the link's level of accuracy and the first location of the successor within the link's level of accuracy.
      S-F: create a S-F link between the first location of the predecessor within the link's level of accuracy and the last location of the successor within the link's level of accuracy.
      F-F: create a F-F link between the last location of the predecessor within the link's level of accuracy and the last location of the successor within the link's level of accuracy.
    Layer 3 links: create a F-S link between the location of the same sub-task in the location sequence.
    Layer 4 links: create a link of the same type between locations shared by both tasks, offset by as many locations as indicated by the location lag. When calculating the offset, the predecessor's location sequence is used. If the link applies only in the same section of the LBS, disregard any links between locations of different LBS sections.
    Layer 5 links are already between single locations so no further action needs to be taken.
  Calculate the forward pass of the schedule
    Sort location-based tasks to precedence order so that all locations of the predecessors of a location-based task (in any location) are before any location of the task, unless layer 4 or 5 logic creates circular location-based logic.

In the case of circular location-based logic, the locations are sorted so that the layer 1, 2 or 4 predecessor's locations are added first to the sort, until the first location that depends on a successor task's start date. Then the successor start dates are calculated until the predecessor's uncalculated start dates are needed to calculate a location's start date.

For each task (or task part) in the sorted order, calculate earliest start using normal CPM calculations both using layer 3 links and disregarding layer 3 links. If desired, do sequence optimization by changing the sequence so that locations are done in sequence of ascending earliest start order (disregarding layer 3 links).

Adjust the start dates of locations based on the selected timing option to force continuity. Record start and finish dates for each task and location activity, and calculate the backward pass of the schedule. Use normal CPM calculations except for the following:
  Total float uses the buffer lag instead of the technical lag.
  Free float disregards layer 3 links.
  Record total float, free float and criticality for each task and location activity.

Figure 4:
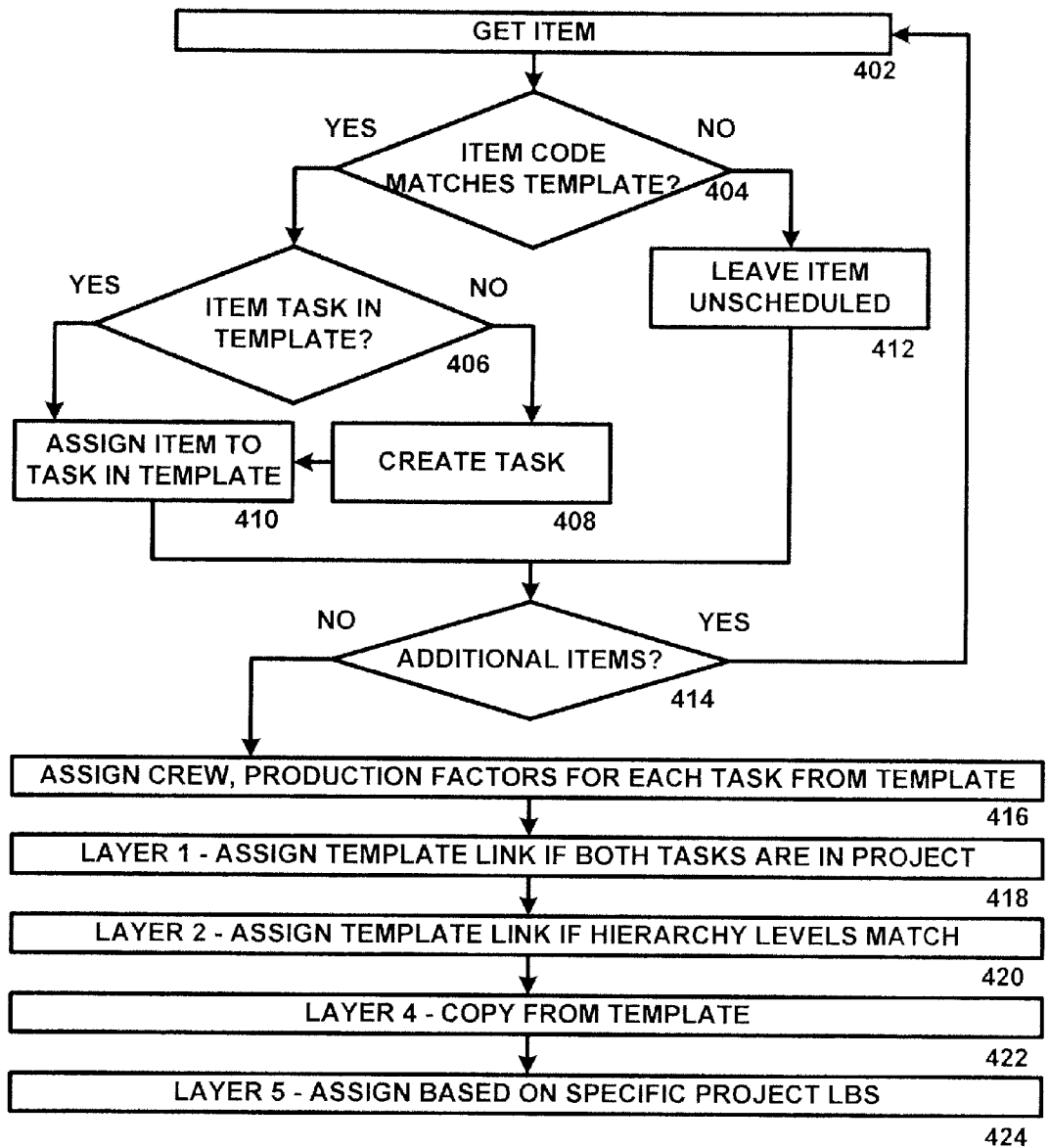
FIG. 4 is a flow chart of a method for automating schedule creation in accordance with an exemplary embodiment of the present invention.

FIG. 4 is a flow chart of a method 400 or automating schedule creation in accordance with an exemplary embodiment of the present invention. The creation of location-based task can be automated by defining the quantity items that are usually produced together in a standard project. This can be practically implemented by using the quantity item code in the bill of quantities as an identifier and lumping the quantities together in the same way as in a standardized template project. For the duration calculation, the same crews as used in the template project can be adopted. The resulting schedule may be created using the following method.

At 402, a quantity item is retrieved from a quantity item repository or database. The method then proceeds to 404 where it is determined whether the quantity item code matches the template quantity item code. It is determined that the quantity item code does match, the method proceeds to 406 where it is determined whether a quantity item task is in the template. If it is determined that a quantity item task is not in the template the method proceeds to 408 wherein a new task is created. The method then proceeds to 410. Likewise, if it is determined that a quantity item task is in the template at 406 the method proceeds directly to 410.

At 410 the item is assigned to the task in a template. For example, each task should have a corresponding task in the template. If one has not been created, it is created at set 408. The method then proceeds to 414.

Likewise, if it is determined in 404 that the item code does not match an item code and template the method proceeds to 412 and the item is left in the schedule. The method then proceeds to 414.

Method 414 is determined whether there are additional items for processing. Additional items remain in the database or are otherwise required for processing the method returns to 402. Otherwise, the method proceeds to 416.

At 416, all scheduled tasks are processed. The optimal crew from a template and the same production factors are assigned to each task. Then the method proceeds to 418.

At 418, precedence links that are found in the template of both tasks that exist in the current project are processed. For example, layer 1 tasks are assigned the template link if both tasks are in the project. After all tasks have been processed, the method proceeds to 420.

At 420, all layer 2 template links are assigned if the hierarchy for the tasks matches the hierarchy level in the template. For example, each template task may have a predetermined hierarchy level. For each task, it is determined whether similar hierarchy levels exist. If similar hierarchy levels exist then the template links are assigned between tasks. The method then proceeds to 422.

Note that for layer 3 links, there is no need to copy any layer 3 links from a template because these links are internal to the task. Thus, at 422 the layer 4 links are copied from the template for each task, and can include linking of tasks based on duration to ensure continuity. Linking can include the shifting of start dates to provide continuity if the initial calculations result in a discontinuous schedule, as well as manipulation of the duration of all CPM activities with a location-based task by changing the properties of the location-based task, such as quantities, productivities or durations. The method then proceeds to 424.

At 424, layer 5 links are assigned based on projects specific location base structure. For example, although automation of schedule creation has largely been accomplished through method 400, any projects specific tasks for layer 5 links must be assigned manually. The method then terminates.

In operation, method 400 allows for automation of a location-based plan system. There are only minor differences between projects of the same general type (residential, retail, etc.) that mainly apply to the location breakdown structure and the quantities of work in each location. Otherwise, optimum crews, productivities, and precedence relationships are often remarkably similar. Therefore, it is possible to automate the work that is involved in the scheduling of a project, to create rapid initial drafts of a schedule project based on standardized packages of tasks, crews and precedence relationships that may be combined with a project specific location breakdown structure, quantities, and productivities.

In this manner, every project does not have to be created as an individual and different project and uniquely scheduled. Scheduling of most projects can be processed in a similar manner, such that information from past projects can be reused by entry of such information in two templates.

Figure 5:
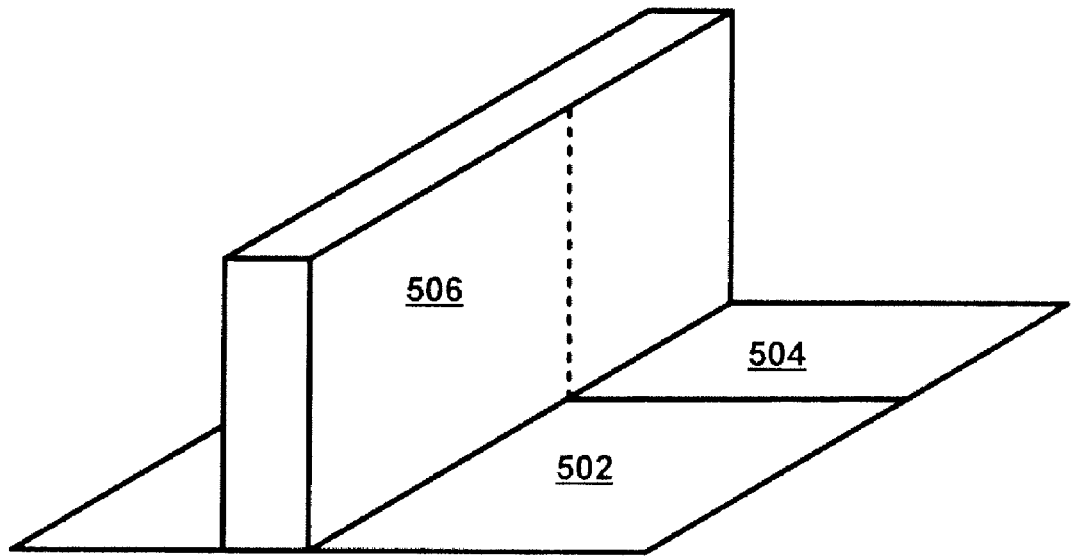
FIG. 5 is a diagram showing non-destructive splitting of an element in accordance with an exemplary embodiment of the present invention.

FIG. 5 is a diagram 500 showing non-destructive splitting of a CAD element in accordance with an exemplary embodiment of the present invention. Diagram 500 includes locations 502 and 504 and wall element 506. Because wall element 506 extends between locations 502 and 504, it may be advantageous to split wall element 506 so as to more accurately model construction activities in locations 502 and 504. In one exemplary embodiment, where wall element 506 can be split and be constructed in parallel, such as where work in locations 502 and 504 can be performed in parallel, non-destructive splitting of wall elements 506 can be used to more accurately model construction planning.

In another exemplary embodiment, such as where wall element 506 is a single pre-cast component or otherwise must be performed as part of a single process, wall element 506 can be assigned to the location having a higher location in a work breakdown structure. In this exemplary embodiment, if location 502 must be completed before location 504 can be completed, wall element 506 can be assigned to location 502.

In a third exemplary embodiment, wall element 506 can be allocated to the location in which the majority of wall element 506 is located, such as where location 502 and location 504 have an equal location in a work breakdown structure, or where a developer elects to allocate wall element 506 to one location, wall element 506 can be allocated to the location in which the majority of wall element 506 is located. Other suitable allocation processes can also or alternatively be utilized.

Figure 6:
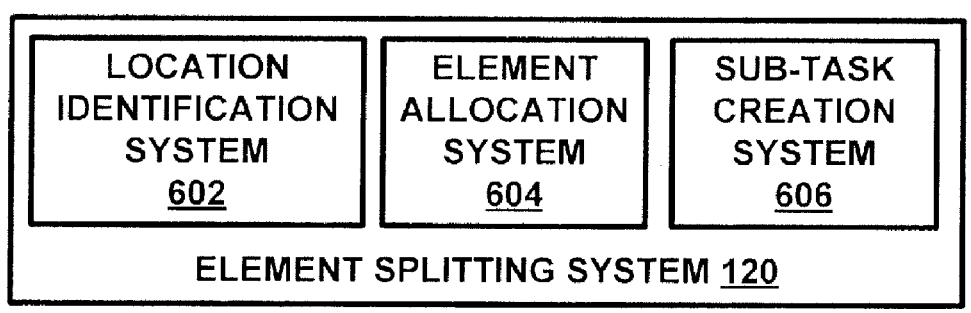
FIG. 6 is a diagram of a system for non-destructive splitting of an element in accordance with an exemplary embodiment of the present invention.

FIG. 6 is a diagram of a system 600 for non-destructive splitting of an element in accordance with an exemplary embodiment of the present invention. System 600 allows an element that is encompassed within two or more locations of a location-based planning system to be split so as to create sub-task for each location, assign the tasks associated with the element to a single location, or for other suitable purposes.

System 600 includes element splitting system 120 and location identification system 602, element allocation system 604 and sub-task creation system 606, each of which can be implemented in hardware, software or a suitable combination of hardware and software, and which can be one or more software systems operating on a general purpose processing platform. Location identification system 602 receives element data and generates one or more locations associated with the element data. In one exemplary embodiment, a user can select an element in a two or three dimensional model, and the location or locations associated with the element can be determined. Location identification system 602 can also provide additional location data related to the element, such as the location in which the majority of the element is located, such as based on a footprint of the element on a two-dimensional floor plan defining the two or more locations, the volume of the element in a three-dimensional area defining the two or more locations (such as where the element is a wall and the locations are two or more floors), or in other suitable manners.

Element allocation system 604 receives element data, location data and control data allocates the element data to the location data. In one exemplary embodiment, element allocation system 604 can allocate an element to one of two or more locations based on the order in which the locations are scheduled to be completed, such as where the element is a single beam, a pre-cast structural component, or other item having tasks that are not amenable to being split into sub-tasks. In another exemplary embodiment, element allocation system 604 can assign elements to locations based on the location in which the majority of the element is located, such as where the element has tasks that are not amenable to being split into sub-tasks and each location has equal priority of completion. Element allocation system 604 can also or alternatively allocate an element to two or more different locations, such as where the element has tasks that are amenable to being split into sub-tasks that can be allocated to two or more different locations.

Sub-task creation system 606 receives element allocation data and generates one or more sub-tasks associated with an element and one or more locations. In one exemplary embodiment, sub-task creation system 606 can identify the tasks associated with an element that are not associated with a specific location, and can create sub-tasks for each location that allocate such tasks based on the amount of the element in each location. In this exemplary embodiment, the tasks for an element such as a wall constructed from bricks or other discrete components can be allocated as sub-tasks to each location containing the wall, such as where location A contains 30% of a wall element, location B contains 40% of the wall element, and location C contains 30% of the wall element. In this example, sub-tasks for construction of 30% of the wall element would be generated for locations A and C, and sub-tasks for construction of 40% of the wall element would be generated for location B.

In operation, system 600 allows an element that is located in two or more locations of a location-based construction modeling system to be non-destructively split by creation of sub-tasks, such that any modification to the association locations that changes the relationship of the element to the locations can be addressed by deletion of the previous sub-tasks and generation of the new sub-tasks. Because the tasks originally associated with the element are not deleted or otherwise modified, system 600 allows the element to be split nondestructively, so as to provide flexibility in construction modeling.

Figure 7:
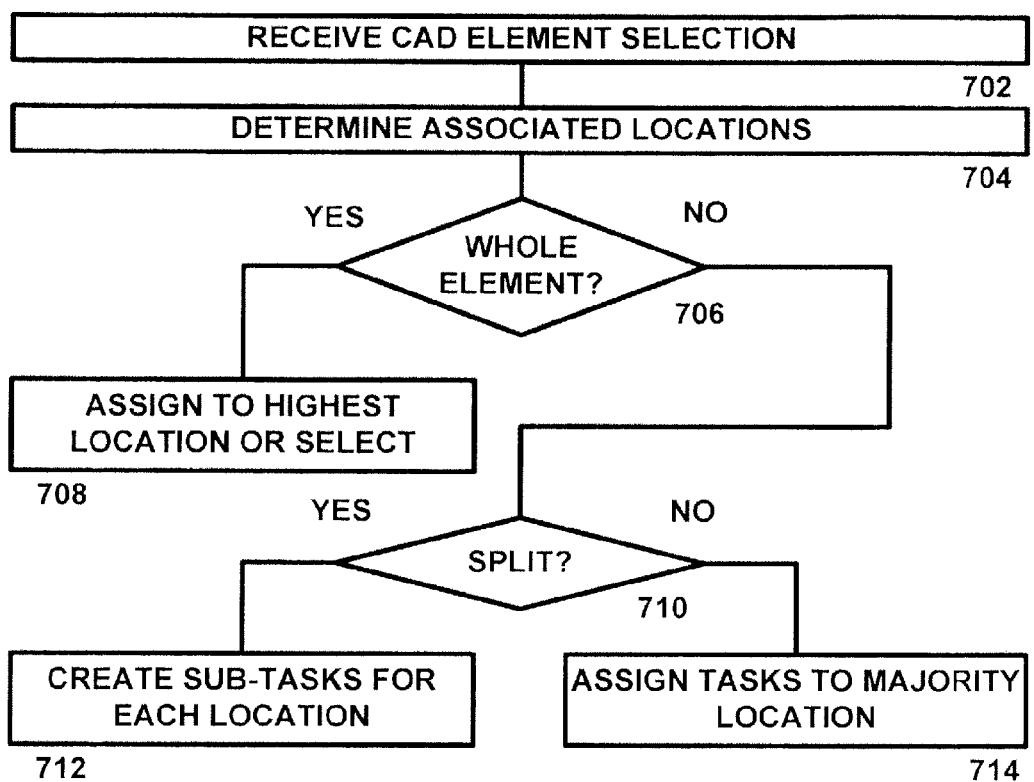
FIG. 7 is a flow chart of a method for non-destructive splitting of elements in accordance with an exemplary embodiment of the present invention.

FIG. 7 is a flow chart of a method 700 for non-destructive splitting of elements in accordance with an exemplary embodiment of the present invention. Method 700 can be implemented in software, such as in one or more software systems operating on a general purpose processing platform.

Method 700 begins at 702, where an element selection is received. In one exemplary embodiment, the element can be selected using a graphic user interface that displays the element in relationship to other elements in a construction planning model. The element can also or alternatively be selected using a pull-down menu, a list, a "click-and-drag" selection technique, or in other suitable manners. The method then proceeds to 704.

At 704, locations associated with the selected element are determined. In one exemplary embodiment, the locations can include one or more locations in which the element is located based on a footprint or outline in a two-dimensional model, based on the volume of the element contained in a three-dimensional model, or in other suitable manners. The allocation of the element in each location can also be determined, such as based on the percentage of the element in each location. The method then proceeds to 706.

At 706, it is determined whether the element is a whole element, such as a pre-cast element, a complete structural element such as a beam, or other suitable items having tasks that are not amenable to being broken out into sub-tasks. If the element is a whole element or otherwise has associated tasks that are not amenable to being broken into sub-tasks, the method proceeds to 708 where the element is assigned to a location having a highest position in a work breakdown structure or other suitable hierarchy. In one exemplary embodiment, where a first location containing the selected element must be completed before a second location containing the selected element is started, the element can be assigned to the first location, which has a higher position relative to the second location. Likewise, where two or more locations containing an element have equal priority, a user can be prompted to select one of the two or more locations, the location containing the greatest percentage of the element can be assigned, or other suitable processes can also or alternatively be used.

If it is determined at 706 that the element is not a whole element or otherwise has tasks that are amenable to being broken out into sub-tasks, the method proceeds to 710, where it is determined whether the element should be non-destructively split. In one exemplary embodiment, a user can be prompted to enter a command to generate the split, a default splitting procedure can be used, or other suitable processes can also or alternatively be used. If it is determined at 710 that the element should be split, the method proceeds to 712. Otherwise, the method proceeds to 714.

At 712, sub-tasks are created for each location based on the extent to which the element is present in the location. In one exemplary embodiment, where the element is defined by tasks that can be allocated based on a percentage of the element present in the location, sub-tasks are created that are related to the original element tasks and reduced by the corresponding percentage. In another exemplary embodiment, tasks that are associated with the element in a specific location are assigned to that location. Other suitable sub-tasks can also or alternatively be created. In this manner, any changes to location parameters that result in re-allocation of the element within the location can be processed by deletion of the sub-tasks and re-allocation of the tasks according to the new location parameters.

At 714, the tasks associated with the element are assigned to the location in which the majority of the element is present. In one exemplary embodiment, the tasks and sub-tasks can be identical, with the exception that the sub-tasks are associated with the selected location. In this manner, any changes to location parameters that result in re-assignment of the element to another location can be processed by deletion of the sub-tasks and re-allocation of the tasks to the new location.

In operation, method 700 allows elements to be non-destructively split in a location-based planning system so as to allow tasks associated with that element to be assigned to separate locations, assigned to a single location, or otherwise processed with destruction of the original element. Method 700 thus allows location parameters to be changed after non-destructive splitting of an element with the need to delete and re-create the element or perform other unnecessary steps.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for location-based management of construction comprising:
    a plurality of locations system implemented on a processor and configured to generate one or more locations where construction activities associated with one or more elements in each location can be performed;
a construction activity location system implemented on a processor and configured to associate each of a plurality of construction tasks with one of the locations, wherein each of the plurality of construction tasks are associated with each location and are not associated with the elements in each location;
an element splitting system implemented on a processor and configured to receive an element selection and to split a selected element associated with the element selection, where the selected element has two or more locations, and to form an association with one of a plurality of construction tasks of the location with a first new sub-element associated with a first location of the split element and another of the plurality of construction tasks of the location with a second new sub-element associated with a second location of the split element;
a construction activity association system implemented on a processor and configured to associate one or more of the plurality of construction tasks with one or more of the other construction tasks;
a construction sequence system implemented on a processor and configured to generate a sequence of construction tasks based on the layer associated with each construction task and based on the other construction tasks associated with each construction task;
a risk modeling system implemented on a processor configured to apply a statistical distribution for one or more of a work crew start time distribution and a weather risk delay distribution to the construction tasks associated with the first and second new sub-elements and the sequence of construction tasks to generate a schedule risk; and
wherein the construction activity location system is further configured to select a set of the split locations where an associated quantity is greater than zero and create a plurality of tasks for the set of split locations.

2. The system of claim 1 wherein the element splitting system is configured to automatically associate two or more construction tasks of the element with the two or more split locations without manual intervention.

3. The system of claim 1 wherein the element splitting system is configured to automatically associate one of two or more construction tasks of the element with one of the two or more split locations without manual intervention, and a second of the two or more construction tasks of the element with a second of the two or more split locations without manual intervention.

4. The system of claim 1 wherein the element splitting system is configured to generate two or more construction sub-tasks based on one or more tasks associated with the element.

5. The system of claim 1 wherein the element splitting system is configured to generate two or more construction sub-tasks based on one or more tasks associated with the element and to associate the two or more sub-tasks with the two or more split locations.

6. The system of claim 1 wherein the element splitting system is configured to generate two or more construction sub-tasks based on one or more tasks associated with the element and to associate one of the two or more sub-tasks with the one of the two or more split locations and a second of the two or more sub-tasks with another of the two or more split locations.

7. The system of claim 1 wherein the element splitting system is configured to associate two or more construction tasks of the element with one of the two or more split locations based on priority data associated with each of the two or more split locations.

8. The system of claim 1 wherein the element splitting system is configured to associate two or more construction tasks of the element with one of the two or more split locations based on the split location in which the majority of the element is located.

9. The system of claim 1 wherein the element splitting system is configured to associate two or more construction tasks of the element with one of the two or more split locations based on priority data associated with each of the two or more split locations and to associate two or more construction tasks of the element with one of the two or more split locations based on the split location in which the majority of the element is located.

10. A method for location-based management of construction comprising:
generating, with a processor, a plurality of locations where construction activities associated with one or more elements in each location can be performed;
generating, with the processor, an element having two or more associated tasks and two or more associated locations;
associating, with a processor, each of a plurality of construction tasks with one of the locations, wherein each of the plurality of construction tasks are associated with each location and are not associated with the elements in each location;
receiving an element selection;
splitting, with a user input device, a selected element associated with the element selection, where the selected element has two or more locations;
forming an association with one of a plurality of construction tasks of the location with a first new sub-element associated with a first location of the split element and another of the plurality of construction tasks of the location with a second new sub-element associated with a second location of the split element;
assigning the associated tasks of the element to the first sub-element and the second sub-element with the processor;
associating, with a processor, one or more of the plurality of construction tasks with one or more of the other construction tasks;
generating, by a processor, a sequence of construction tasks based on the layer associated with each construction task and based on the other construction tasks associated with each construction task;
applying, by a processor, a statistical distribution for one or more of a work crew start time distribution and a weather risk delay distribution to the associated tasks of the first and second sub-elements to generate a schedule risk distribution with the processor.

11. The method of claim 10 where assigning the associated tasks of the element to the two or more split locations comprises assigning one of the associated tasks to one of the two or more split locations and assigning a second of the associated tasks to a second of the two or more split locations.

12. The method of claim 10 where assigning the associated tasks of the element to the two or more split locations comprises:
generating a sub-task related to one of the associated tasks; and
assigning the sub-task to one of the two or more split locations.

13. The method of claim 12 where assigning the associated tasks of the element to the two or more split locations comprises:
  generating a second sub-task related to a second of the associated tasks; and
  assigning the second sub-task to a second of the two or more split locations.

14. The method of claim 10 where assigning the associated tasks of the element to the two or more split locations comprises assigning the associated tasks to the two or more split locations based on a percentage of the element contained in each of the two or more split locations.

15. A system for location-based management of construction comprising:
  means for generating one or more locations where construction activities associated with one or more elements in each location can be performed;
  a construction activity location system implemented on a processor and configured to associate each of a plurality of construction tasks with one of the locations, wherein each of the plurality of construction tasks are associated with each location and are not associated with the elements in each location;
  means for receiving an element selection, splitting the selected element associated with the element selection into a first sub-element and a second sub-element, where the selected element has two or more locations, and forming an association with one of a plurality of construction tasks of the location with the first sub-element associated with a first location of the split element and another of the plurality of construction tasks of the location with the second sub-element associated with a second location of the split element;
  a construction activity association system implemented on a processor and configured to associate one or more of the plurality of construction tasks with one or more of the other construction tasks;
  a construction sequence system implemented on a processor and configured to generate a sequence of construction tasks based on the layer associated with each construction task and based on the other construction tasks associated with each construction task;
  a risk modeling system implemented on a processor configured to apply a statistical distribution for one or more of a work crew start time distribution and a weather risk delay distribution to the construction tasks associated with the first and second new sub-elements and the sequence of construction tasks to generate a schedule risk; and
  wherein the construction activity location system is further configured to select a set of the split locations where an associated quantity is greater than zero and create a plurality of tasks for the set of split locations.

16. The system of claim 15 comprising means for generating one or more sub-tasks associated with the one or more construction tasks.

17. The system of claim 15 comprising means for assigning the associated tasks to the two or more locations based on a percentage of the element contained in each of the two or more locations.

18. The system of claim 1 wherein the construction activity location system is further configured to identify a plurality of split locations stored in an electronic data memory device where an associated quantity is greater than zero, to select the set of split locations from the identified plurality of split locations, and create the plurality of tasks for the set of split locations, wherein at least one task is automatically generated for each split location that did not previously exist and without manual intervention.

19. The method of claim 10 wherein creating the plurality of tasks for the set of split locations comprises automatically creating the plurality of tasks for the set of split locations without manual intervention, wherein at least one task is generated for each split location of the set of split locations.

20. The system of claim 1 wherein the risk modeling system is configured to automatically calculate a risk potential for one or more of a project early finish date and a project late finish date.

* * * * *